United States Patent [19]

Ogawa et al.

[11] Patent Number: 5,491,588

[45] Date of Patent: Feb. 13, 1996

[54] AFOCAL ZOOMING OPTICAL SYSTEM

[75] Inventors: Ryota Ogawa, Tokyo; Hiroyuki Kato, Nagano, both of Japan

[73] Assignee: Asahi Kogaku Kogyo Kabushiki Kaisha, Tokyo, Japan

[21] Appl. No.: 800,118

[22] Filed: Nov. 29, 1991

[30] Foreign Application Priority Data

Nov. 30, 1990 [JP] Japan .................................. 2-335935

[51] Int. Cl.$^6$ ................................................. G02B 15/14
[52] U.S. Cl. ........................ 359/676; 359/684; 359/687
[58] Field of Search ................................ 359/684, 676, 359/687

[56] References Cited

U.S. PATENT DOCUMENTS

| | | | |
|---|---|---|---|
| 4,439,018 | 3/1984 | Okajima et al. ..................... | 359/705 |
| 5,028,125 | 7/1991 | Kikuchi ................................. | 359/676 |
| 5,136,431 | 8/1992 | Terasawa et al. .................... | 359/684 |
| 5,191,475 | 3/1993 | Terasawa et al. .................... | 359/684 |

*Primary Examiner*—Scott J. Sugarman
*Attorney, Agent, or Firm*—Sughrue, Mion, Zinn, Macpeak & Seas

[57] ABSTRACT

An afocal zooming optical system includes a plurality of lens groups or components, in which some of the lens groups movable along the optical axis for zooming are included in the dioptry adjusting lens groups movable for dioptry adjustment, with others of the lens groups movable for zooming being excluded from said dioptry adjusting lens groups.

5 Claims, 12 Drawing Sheets

5,491,588

AFOCAL ZOOMING OPTICAL SYSTEM

BACKGROUND OF THE INVENTION

This application is based on and claims priority from Japanese Application No. HEI 2-335935 filed Nov. 30, 1990, the disclosure of which is incorporated by reference herein.

The present invention relates to an afocal optical system for use with binoculars and monoculars, particularly to a zooming optical system capable of changing magnification.

Throughout this specification, the terms "group" and "component" are used interchangeably to refer to a structure comprising at least one lens element.

Eyepiece optical systems such as binoculars are often provided with a dioptry adjustment capability for adjusting the focus in accordance with the eyesight of the user. With zooming optical systems which are capable of adjusting the magnification (focal length), a reference dioptry which does not change with the magnification is determined at the design stage.

If there is even a partial overlap between the lens group movable for dioptry adjustment and the lens group movable for zooming, the change in dioptry due to zooming cannot be suppressed for all dioptries. Under these circumstances, the dioptry most commonly used is specified as a reference, and the system is designed such that zooming will cause no change in dioptry at least in the case where the system is set for the reference dioptry. Hence, there will be no change in dioptry due to magnification alterations if the system is set for the reference dioptry. However, if the system is set for values other than the reference dioptry, magnification alterations will cause changes in dioptry, and another dioptry adjustment becomes necessary.

FIG. 21 shows a conventional zooming optical system. An objective optical unit that is positioned closer to the object than a field ring S is composed of a fixed first lens group G1 and a second lens group G2 movable for zooming, whereas an eyepiece optical unit positioned closer to the eye than the field ring S is composed of a third lens group G3 movable for zooming and a fourth lens group G4 that is fixed during zooming. Dioptry adjustment is effected by moving altogether the three lens groups enclosed with a dashed line, i.e., the second lens group G2, the third lens group G3 and the fourth lens group G4.

A problem with this prior art zooming optical system is that the lens groups movable for dioptry adjustment experience a great change in focal length during zooming, since those dioptry adjusting lens groups contain all of the lens groups G2 and G3 which have a zooming capability. The eyesight mismatch decreases with decreasing change in the focal lengths of the dioptry adjusting groups, so a great eyesight mismatch will inevitably occur in the conventional system.

SUMMARY OF THE INVENTION

It is therefore an object of the present invention to provide and afocal zooming optical system that is capable of substantially preventing the occurrence of eyesight mismatch during zooming.

This and other objects of the invention are attained by an afocal zooming optical system comprising a plurality of lens groups or components, in which some of the lens groups movable along the optical axis for zooming are included in the dioptry adjusting lens groups movable for dioptry adjustment, and others of the lens groups movable for zooming being excluded from the dioptry adjusting lens groups.

BRIEF DESCRIPTION OF THE DRAWINGS

The invention will be more clearly understood from the following description in conjunction with the accompanying drawings, in which.

Figure 1:
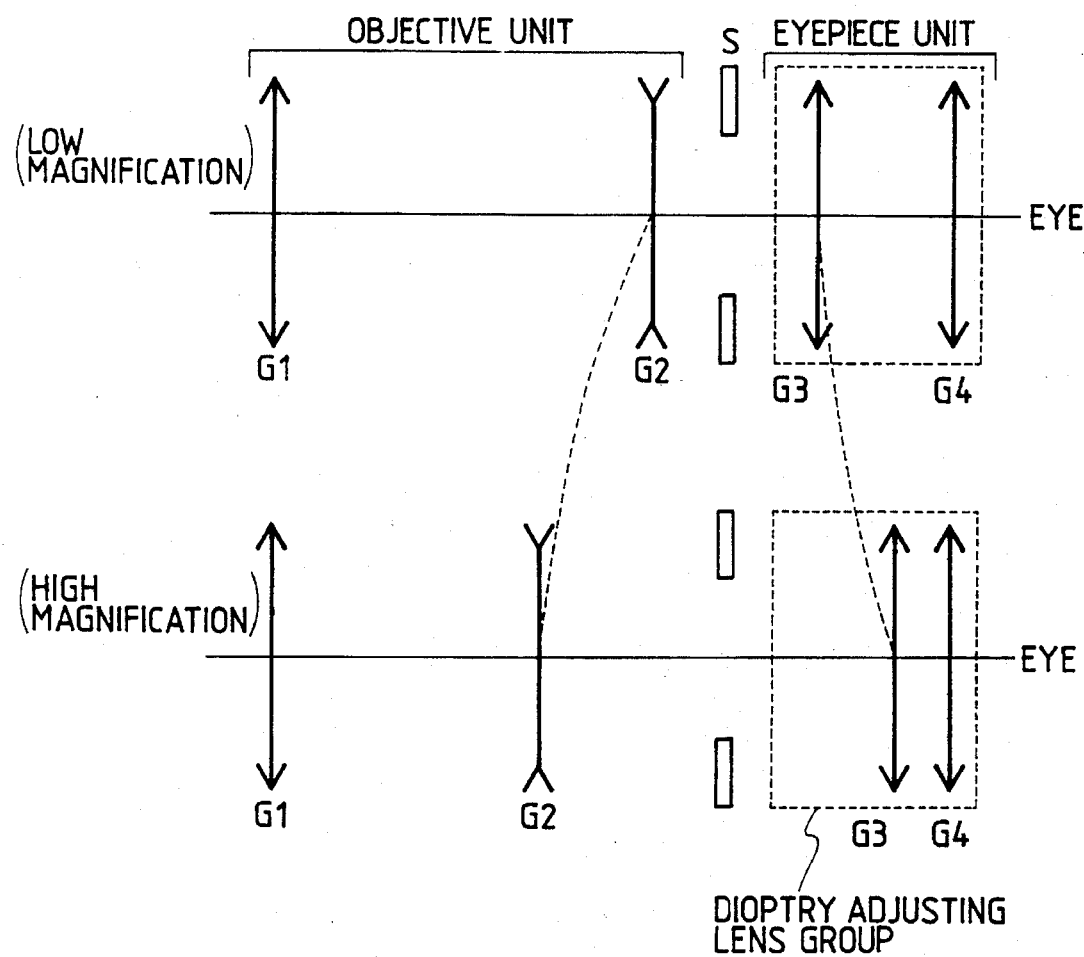
FIG. 1 is a schematic diagram illustrating the operation of an afocal zooming optical system according to the present invention.

In the drawings, ER is the eye ring, ERφ means a diameter of the eye ring, B is the angle defined by the optical axis and the principal ray of the exit pupil light flux.

DETAILED DESCRIPTION OF THE PREFERRED EMBODIMENTS

The present invention will now be described with reference to FIGS. 1–20, with the operating theory of the present invention being first described.

An afocal zooming optical system such as a monocular or binocular having a zooming capability is composed of a plurality of lens groups with at least part of the system being moved along the optical axis for zooming, and with at least a part of the system being moved along the optical axis for dioptry adjustment. If the lens groups movable for zooming are defined as "zooming lens groups" whereas those movable for dioptry adjustment are defined as a "dioptry adjusting lens groups", the two sets of groups overlap at least partially. In other words, at least one lens group serves both as a zooming group and as a dioptry adjusting group.

As already mentioned, a dioptry set for values other than a reference dioptry will change upon zooming. If the amount of change in dioptry (eyesight mismatch) that occurs upon zooming from a low to a high magnification is expressed by ΔDI, its value can be determined by:

$$\Delta DI = (DIW - DIO) \cdot (fxw/fxt)^2 \qquad (1)$$

where DIW is the dioptry set for low magnification, DIO is the reference dioptry, fxw is the composite focal length of the dioptry adjusting lens groups at low magnification, and fxt is the composite focal length of the dioptry adjusting lens group at high magnification.

As one can see from equation (1), the eyesight mismatch that occurs upon zooming can be suppressed or held at a low value by reducing the change in the composite focal length of the dioptry adjusting lens groups which are moved for dioptry adjustment.

Hence, in the afocal zooming optical system of the present invention, at least one of the zooming lens groups is included as a dioptry adjusting lens group movable for dioptry adjustment, whereas at least one of the zooming lens groups is not included as a dioptry adjusting lens group. Compared to the case where all of the zooming lens groups are included as dioptry adjusting lens groups, the system of the present invention has the advantage that the focal length of the dioptry adjusting lens group experiences only a small change upon zooming, whereby possible eyesight mismatch can be reduced to a small level.

It is possible to perform the dioptry adjustment only with the fourth lens group G4. It is, however, possible to move the third and fourth groups G3, G4 for the dioptry adjustment. In this case, the amount of movement of the lens groups for the adjustment may be small.

FIG. 1 shows a four-group zoom lens system as an embodiment of the present invention. An objective optical unit that is positioned closer to the object than a field ring S is composed of a fixed first lens group G1 and a second lens group G2 movable for zooming. An eyepiece optical unit that is positioned closer to the image than the field ring S is composed of a third lens group G3 movable for zooming and a fourth lens group G4 that is fixed during zooming. Dioptry adjustment is effected by moving in unison the two lens groups enclosed with a dashed line, i.e., the third lens group G3 and the fourth lens group G4. Hence, in accordance with the present invention, the third lens group G3 which is a zooming lens group is also included as a dioptry adjusting lens group, but the second lens group G2 which is also a zooming lens group is not included as a dioptry adjusting lens group.

Figure 2:
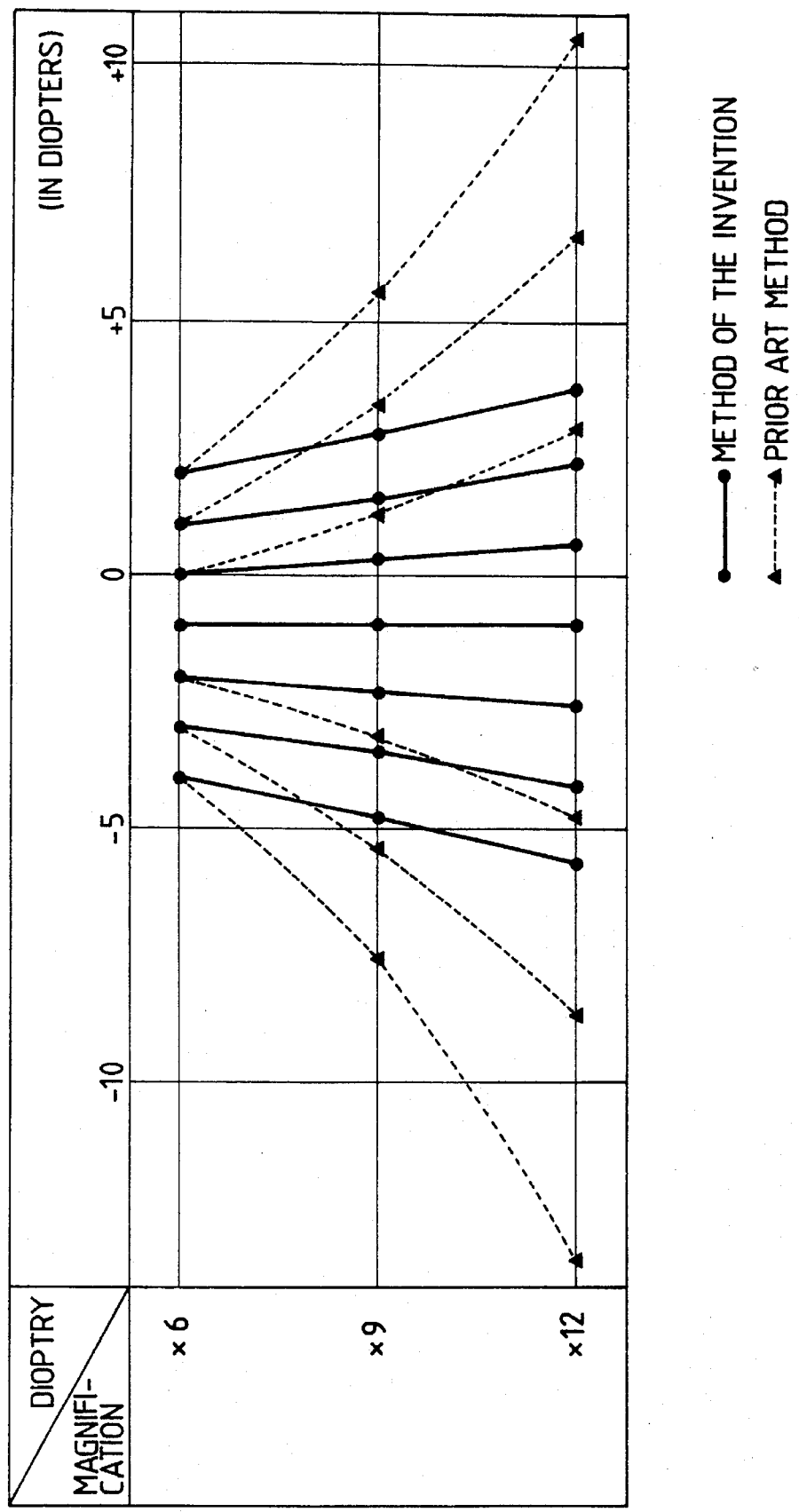
FIG. 2 is a graph comparing eyesight mismatch for the case of a conventional lens system and the system of FIG. 1.
Figure 21:
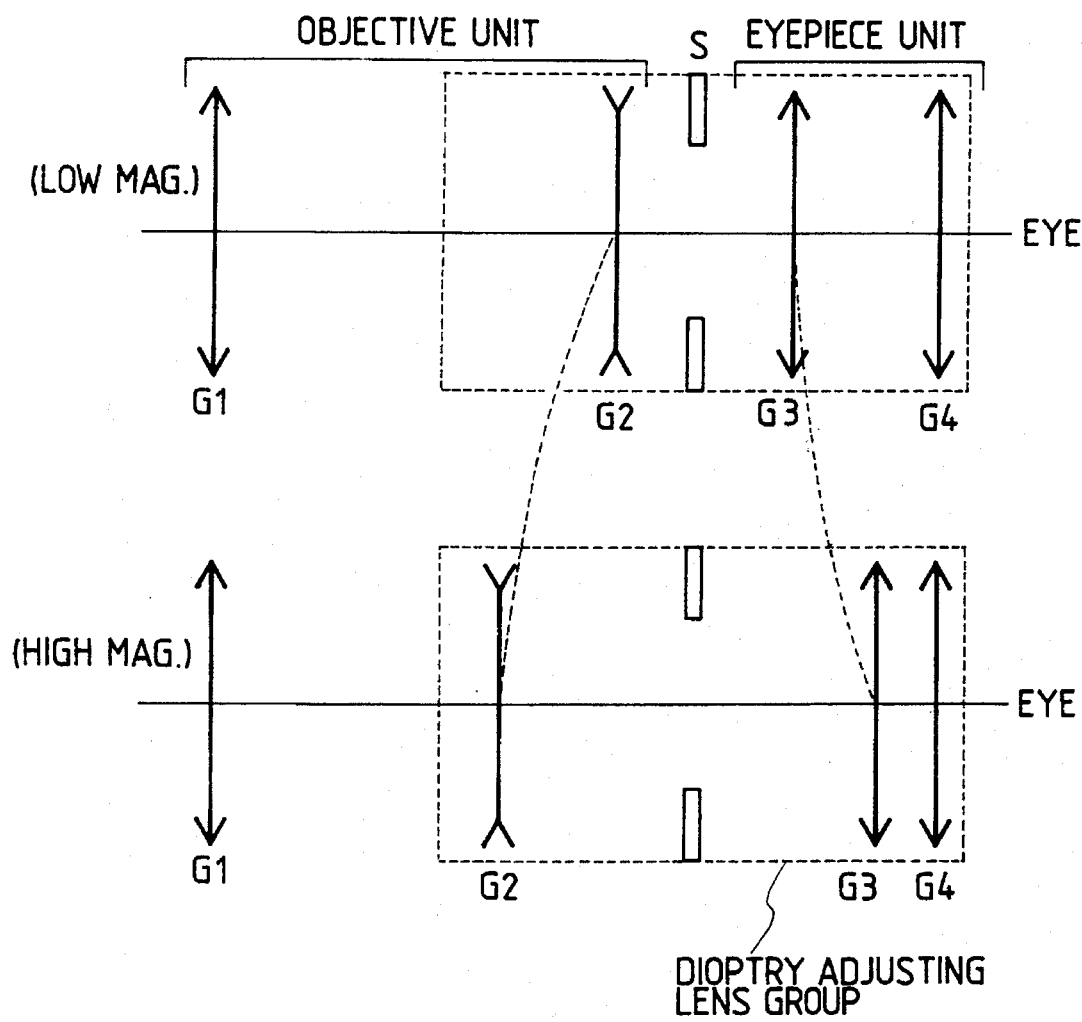
FIG. 21 is a schematic diagram showing a conventional afocal zooming optical system.

FIG. 2 compares the eyesight mismatch between two cases: one being such that dioptry adjustment is effected with a four-group zoom lens system by the method illustrated in FIG. 1, and the other being the case where dioptry adjustment is effected with a zoom lens system of the same composition by the conventional method shown in FIG. 21. The result obtained by the embodiment of FIG. 1 is indicated by solid lines, with the lens configuration corresponding to Lens Composition 2 set forth later herein. The result obtained by the conventional method is indicated by dashed lines.

As one can see from FIG. 2, the system of the present invention in which at least one of the zooming lens groups is not included as a dioptry adjusting lens group has the advantage that the eyesight mismatch can be reduced to a smaller level than in the case where all of the zooming lens groups are included as dioptry adjusting lens groups.

Three specific examples of the lens composition that can be adopted to realize the optical system described above are set forth below. In these examples, the reference dioptry is set at −1 diopter.

Lens Composition 1

Figure 3:
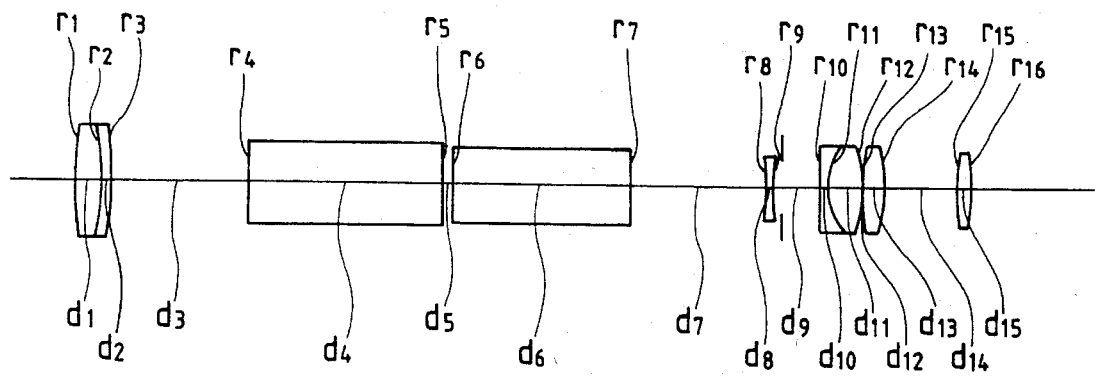
FIGS. 3, 5 and 7 illustrate the composition of the lens system according to a first embodiment of the present invention in low magnification, moderate magnification and high magnification positions, respectively.
Figure 5:
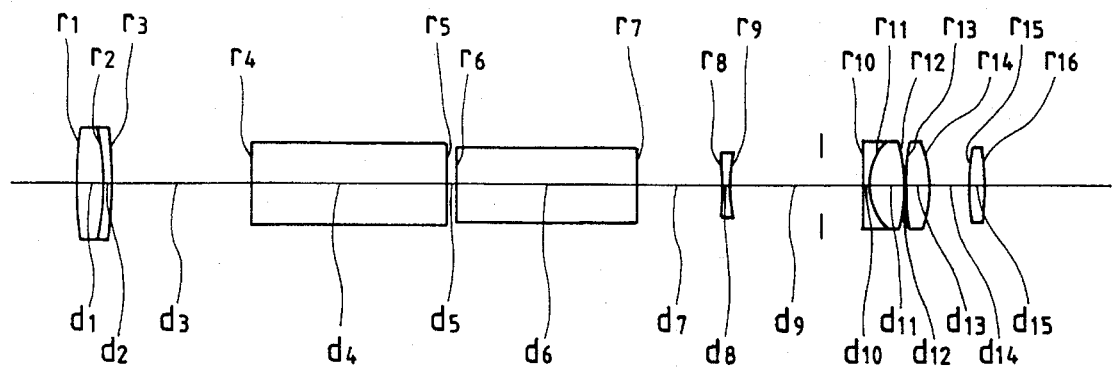
Figure 7:
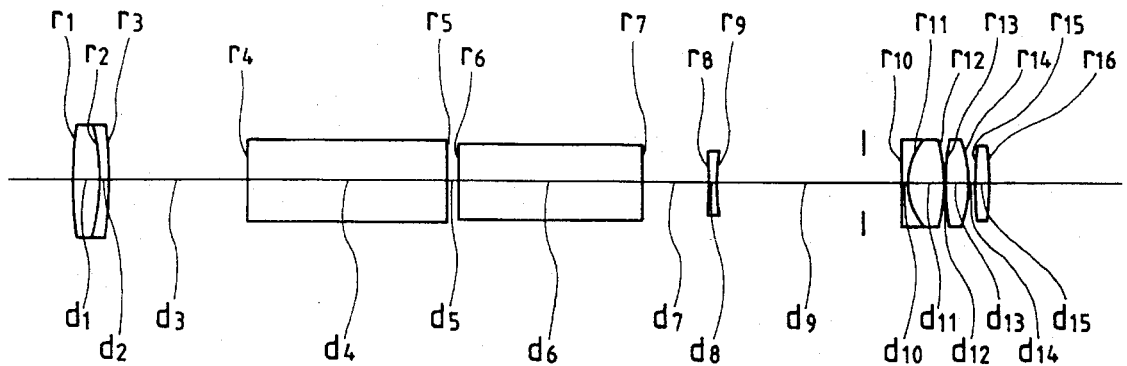

FIGS. 3, 5 and 7 show a first embodiment of the lens composition for the zooming optical system of the present invention, at low, moderate and high magnifications, respectively.

Specific numerical data for the system are given in Table 1, wherein r is the radius of curvature of an individual lens surface, d is the lens thickness or air space, n is the refractive index of a lens, and ν is the Abbe number of a lens. The fourth to the seventh surfaces are those of erecting prisms.

The magnification is altered by changing d7, d9 and d14, and the numerical data for the respective alterations are given in Table 2, wherein f0 is the focal length of the objective optical unit, fe is the focal length of the eyepiece optical unit, and ω is the half view angle. As already mentioned, the reference dioptry is −1 diopter.

Figure 4:
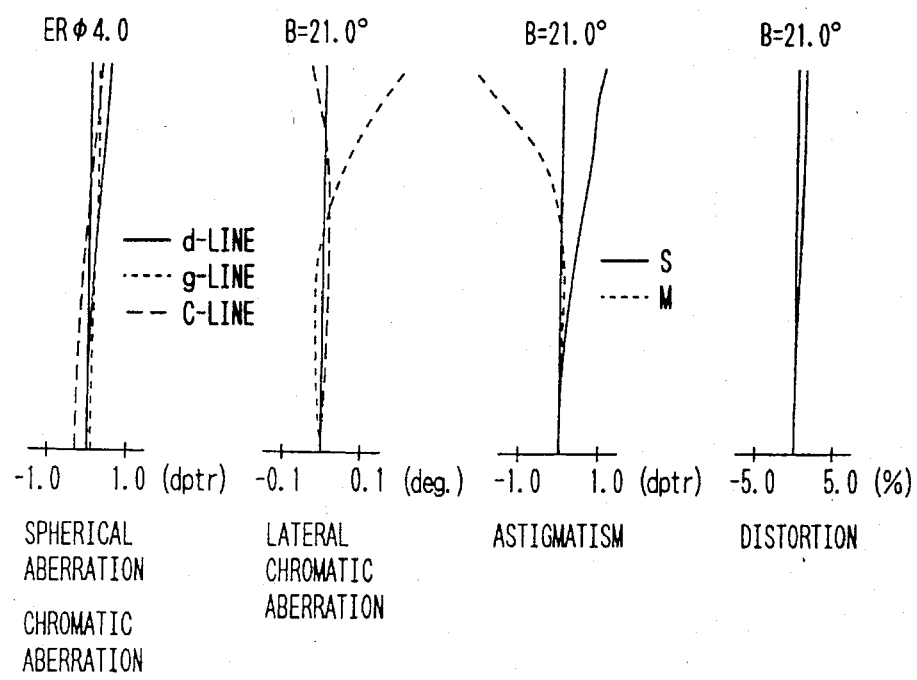
FIGS. 4, 6 and 8 are graphs plotting the aberration curves for the lens systems as illustrated in FIGS. 3, 5 and 7, respectively.
Figure 6:
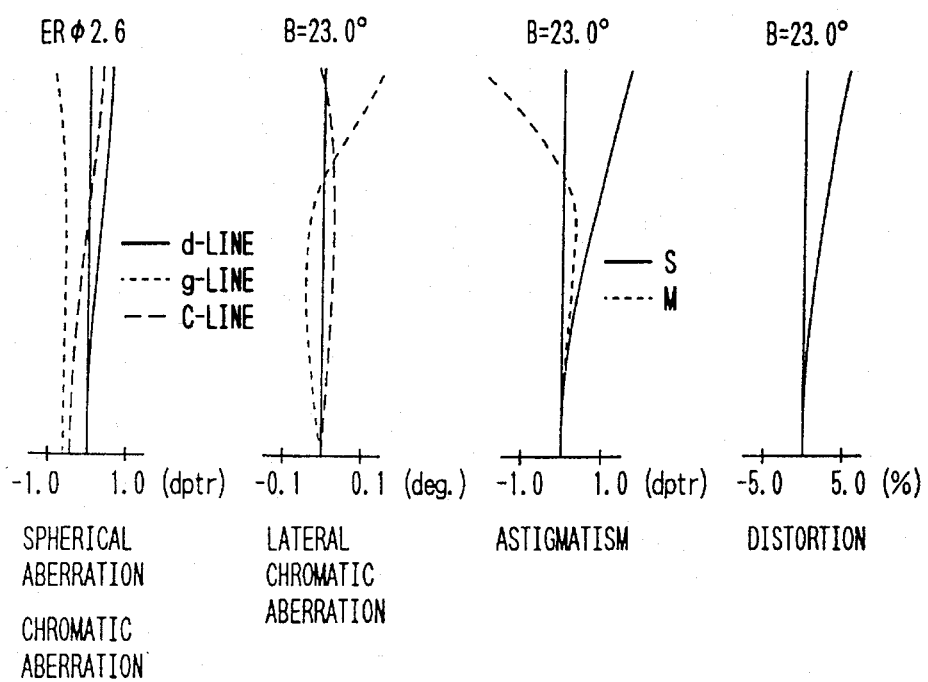
Figure 8:
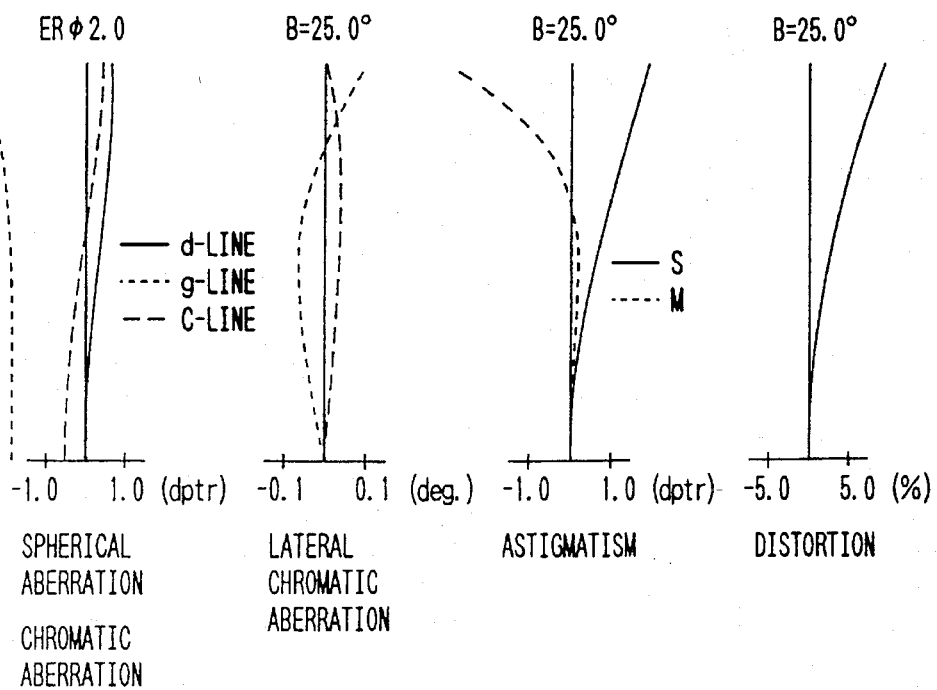

The aberration curves obtained with lens composition 1 are plotted in FIG. 4 for low magnification, in FIG. 6 for moderate magnification and in FIG. 8 for high magnification.

TABLE 1

| Surface No. | r | d | n | ν |
|---|---|---|---|---|
| 1 | 63.811 | 4.79 | 1.51633 | 64.1 |
| 2 | −38.439 | 1.31 | 1.62004 | 36.3 |
| 3 | −117.465 | 23.76 | | |
| 4 | ∞ | 33.26 | 1.56883 | 56.3 |
| 5 | ∞ | 1.58 | | |
| 6 | ∞ | 30.09 | 1.56883 | 56.3 |
| 7 | ∞ | variable | | |
| 8 | −70.480 | 1.31 | 1.51633 | 64.1 |
| 9 | 26.398 | variable | | |
| 10 | −322.719 | 1.31 | 1.80518 | 25.4 |
| 11 | 11.419 | 5.82 | 1.71300 | 53.8 |
| 12 | −23.749 | 0.17 | | |
| 13 | 55.560 | 3.72 | 1.51633 | 64.1 |
| 14 | −21.238 | variable | | |
| 15 | 35.161 | 2.56 | 1.51633 | 64.1 |
| 16 | −54.737 | | | |

TABLE 2

| | Low Magnification | Moderate Magnification | High Magnification |
|---|---|---|---|
| f0 | 100.000 | 133.95 | 158.93 |
| fe | 16.69 | 15.02 | 13.36 |
| ω | 3.50° | 2.56° | 2.08° |
| d7 | 23.27 | 14.41 | 10.30 |
| d9 | 7.03 | 21.13 | 31.71 |
| d14 | 12.28 | 7.04 | 0.57 |

When dioptry adjustment is effected by the method shown in FIG. 1, the dioptry present for the low magnification will vary at the moderate and high magnifications as shown in Table 3. Table 4 shows the numerical data obtained in the case where the same optical system is used, but where dioptry adjustment is by the prior art method shown in FIG. 21. In Tables 3 and 4, symbol fx denotes the composite focal length of the dioptry adjusting lens groups.

TABLE 3

| DIOPTRY fx (In Diopters) | | |
|---|---|---|
| Low Magnification | Moderate Magnification | High Magnification |
| −4.0 | −4.7 | −5.7 |
| −2.0 | −2.2 | −2.6 |
| −1.0 | −1.0 | −1.0 |

TABLE 3-continued

| | DIOPTRY fx (In Diopters) | | |
|---|---|---|---|
| | Low Magnification | Moderate Magnification | High Magnification |
| | 0.0 | +0.2 | +0.6 |
| | +2.0 | +2.7 | +3.7 |
| | 16.69 | 15.02 | 13.36 |

TABLE 4

| DIOPTRY fx (In Diopters) | | |
|---|---|---|
| Low Magnification | Moderate Magnification | High Magnification |
| −4.0 | −7.7 | −12.9 |
| −2.0 | −3.2 | −5.0 |
| −1.0 | −1.0 | −1.0 |
| 0.0 | +1.2 | +3.0 |
| +2.0 | +5.7 | +10.9 |
| 15.89 | 10.64 | 7.96 |

Lens Composition 2

Figure 9:
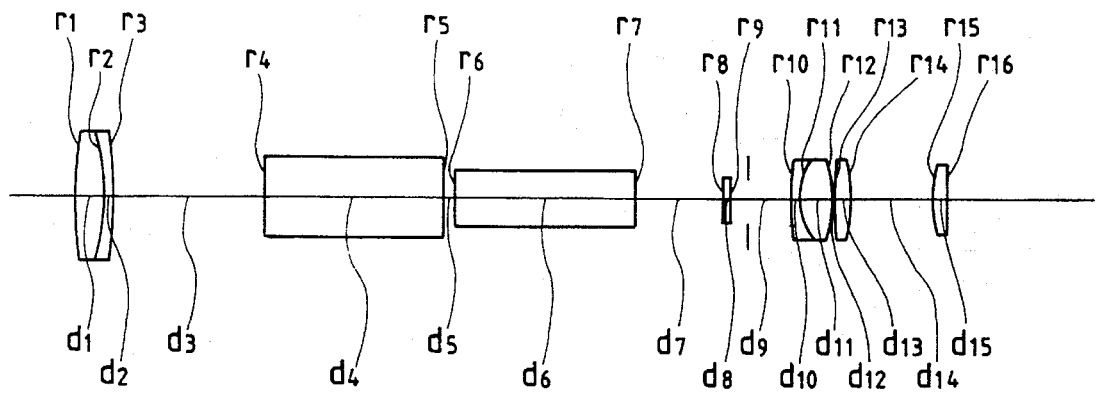
FIGS. 9, 11 and 13 illustrate the composition of the lens system according to a second embodiment of the present invention in low magnification, moderate magnification and high magnification positions, respectively.
Figure 11:
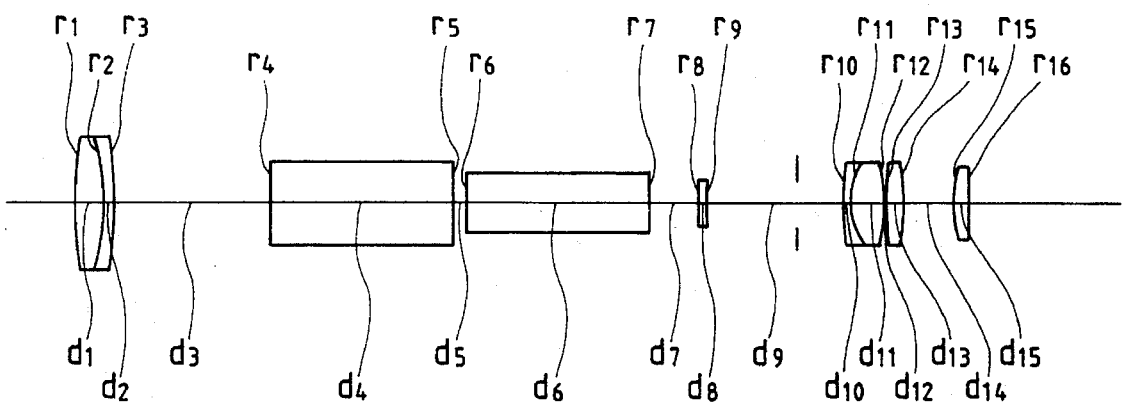
Figure 13:
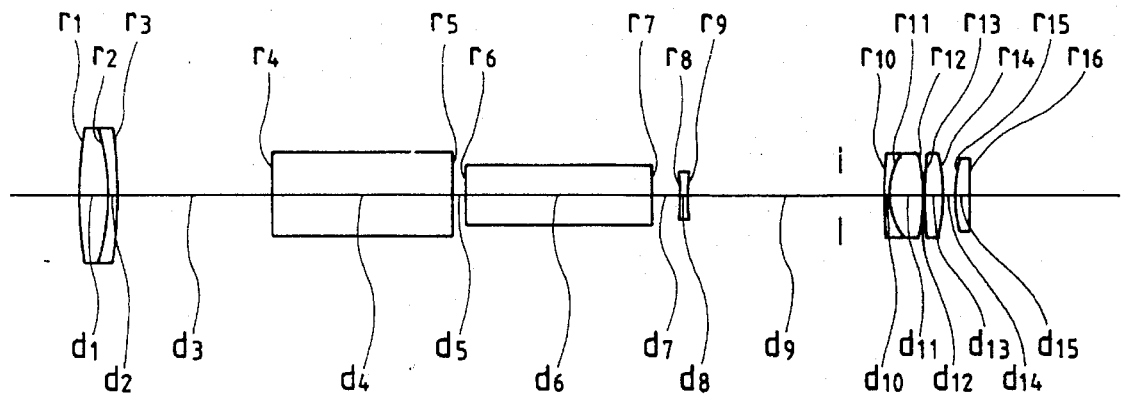

FIGS. 9, 11 and 13 show a second embodiment of the lens composition for the zooming optical system of the present invention, at low, high and moderate magnifications, respectively. Specific numerical data for the system are given in Table 5. In Lens Composition 2, the magnification is altered by changing d7, d9 and d14, and the numerical data for the respective alterations are given in Table 6.

Figure 10:
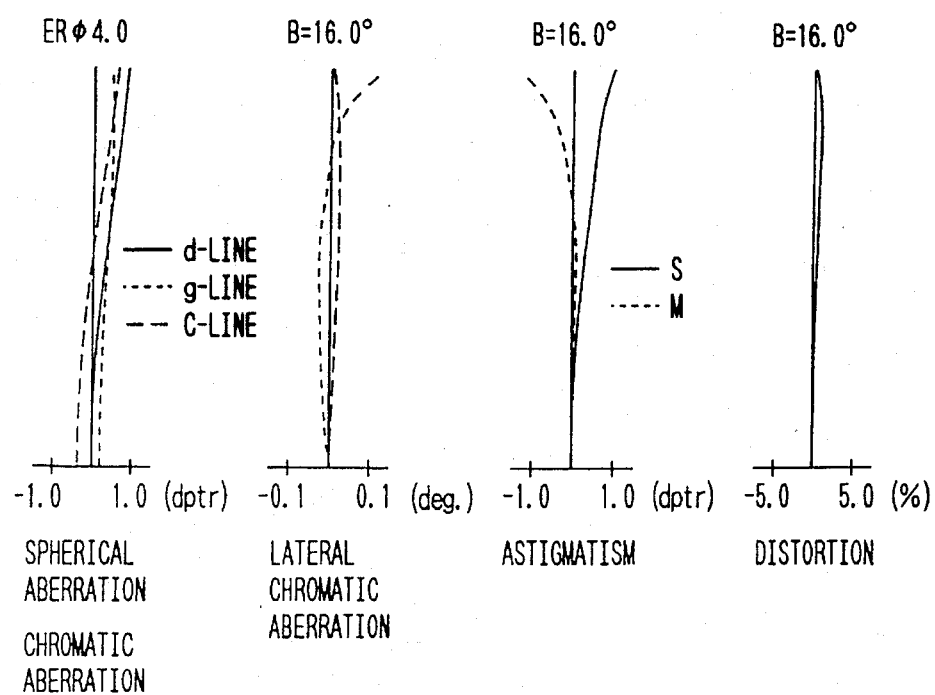
FIGS. 10, 12 and 14 are graphs plotting the aberration curves for the lens systems as illustrated in FIGS. 9, 11 and 13, respectively.
Figure 12:
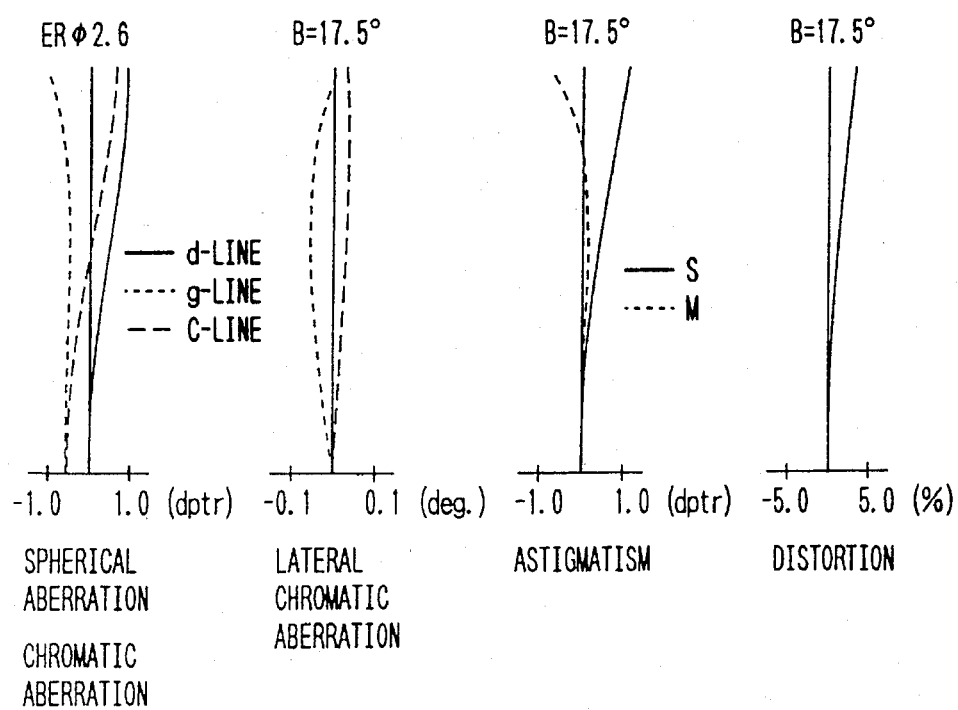
Figure 14:
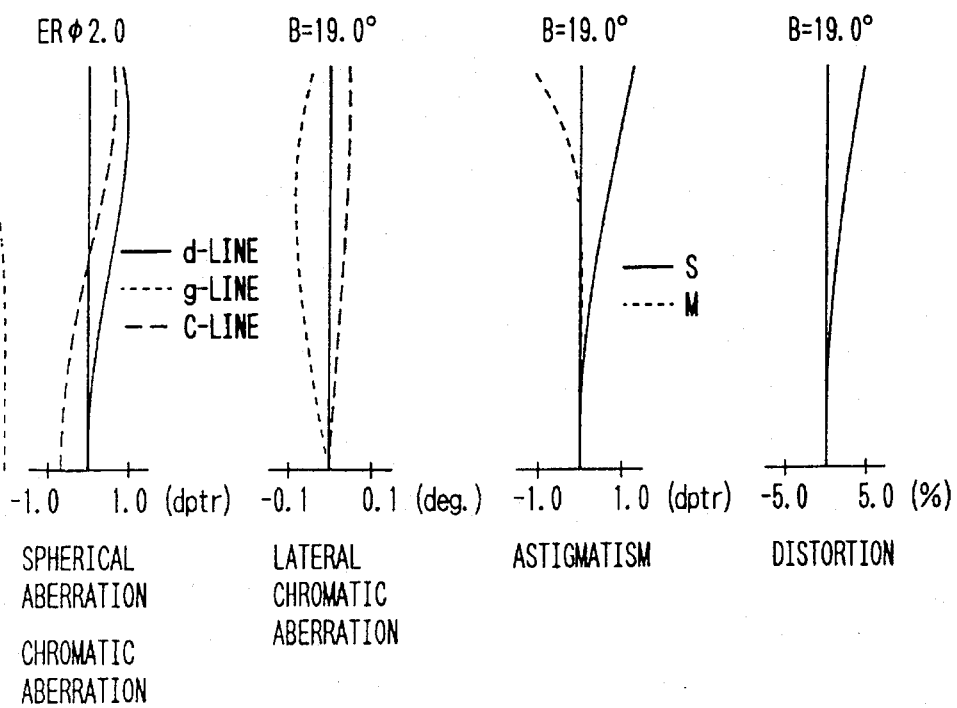

The aberration curves obtained with Lens Composition 2 are plotted in FIGS. 10, 12 and 14 for low, moderate and high magnifications, respectively.

TABLE 5

| Surface No. | r | d | n | ν |
|---|---|---|---|---|
| 1 | 57.232 | 4.99 | 1.51633 | 64.1 |
| 2 | −36.823 | 1.45 | 1.62004 | 36.3 |
| 3 | −116.590 | 25.89 | | |
| 4 | ∞ | 29.93 | 1.56883 | 56.3 |
| 5 | ∞ | 1.81 | | |
| 6 | ∞ | 29.93 | 1.56883 | 56.3 |
| 7 | ∞ | variable | | |
| 8 | −41.540 | 1.18 | 1.51633 | 64.1 |
| 9 | 26.168 | variable | | |
| 10 | 55.235 | 1.18 | 1.80518 | 25.4 |
| 11 | 10.857 | 5.62 | 1.71300 | 53.8 |
| 12 | −22.194 | 0.36 | | |
| 13 | 145.117 | 2.63 | 1.51633 | 64.1 |
| 14 | −26.719 | variable | | |
| 15 | 19.391 | 2.36 | 1.51633 | 64.1 |
| 16 | 141.943 | | | |

TABLE 6

| | Low Magnification | Moderate Magnification | High Magnification |
|---|---|---|---|
| f0 | 100.00 | 131.84 | 155.83 |
| fe | 16.45 | 14.68 | 13.14 |
| ω | 2.67° | 1.94° | 1.58° |
| d7 | 14.31 | 7.77 | 4.61 |
| d9 | 10.23 | 22.23 | 31.36 |

TABLE 6-continued

| | Low Magnification | Moderate Magnification | High Magnification |
|---|---|---|---|
| d14 | 13.37 | 7.90 | 1.93 |

When dioptry adjustment is effected by the method shown in FIG. 1, the dioptry preset for the low magnification will vary at the moderate and high magnifications as shown in Table 7. Table 8 shows the numerical data obtained in the case where the same optical system is used, but where dioptry is adjusted by the prior art method shown in FIG. 21. In Tables 7 and 8, symbol fx denotes the composite focal length of the dioptry adjusting lens groups.

TABLE 7

| DIOPTRY fx (In Diopters) | | |
|---|---|---|
| Low Magnification | Moderate Magnification | High Magnification |
| −4.0 | −4.8 | −5.7 |
| −2.0 | −2.3 | −2.6 |
| −1.0 | −1.0 | −1.0 |
| 0.0 | +0.3 | +0.6 |
| +2.0 | +2.8 | +3.7 |
| 16.45 | 14.68 | 13.14 |

TABLE 8

| DIOPTRY fx (In Diopters) | | |
|---|---|---|
| Low Magnification | Moderate Magnification | High Magnification |
| −4.0 | −7.6 | −12.5 |
| −2.0 | −3.2 | −4.8 |
| −1.0 | −1.0 | −1.0 |
| 0.0 | +1.2 | +2.8 |
| +2.0 | +5.6 | +10.5 |
| 14.52 | 9.80 | 7.41 |

Lens Composition 3

Figure 15:
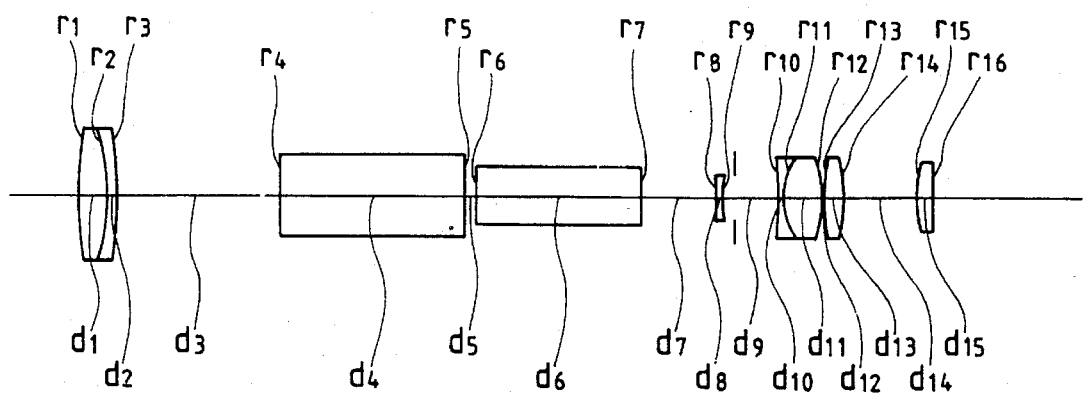
FIGS. 15, 17 and 19 illustrate the composition of the lens system according to a second embodiment of the present invention in low magnification, moderate magnification and high magnification positions, respectively.
Figure 17:
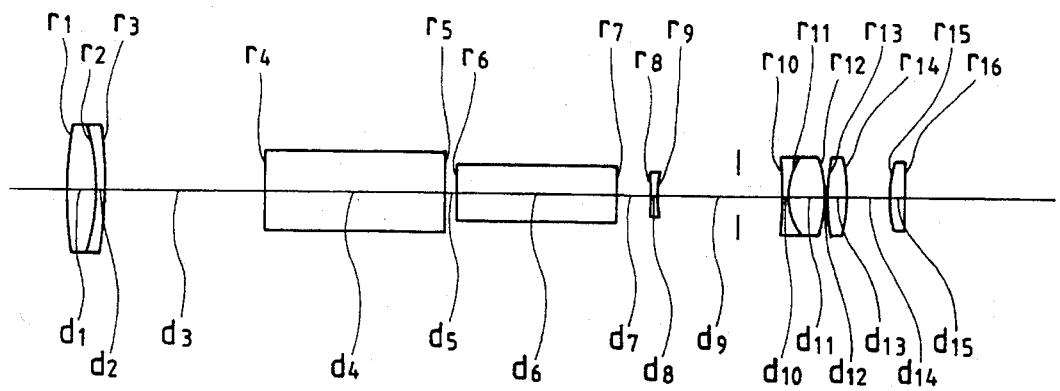
Figure 19:
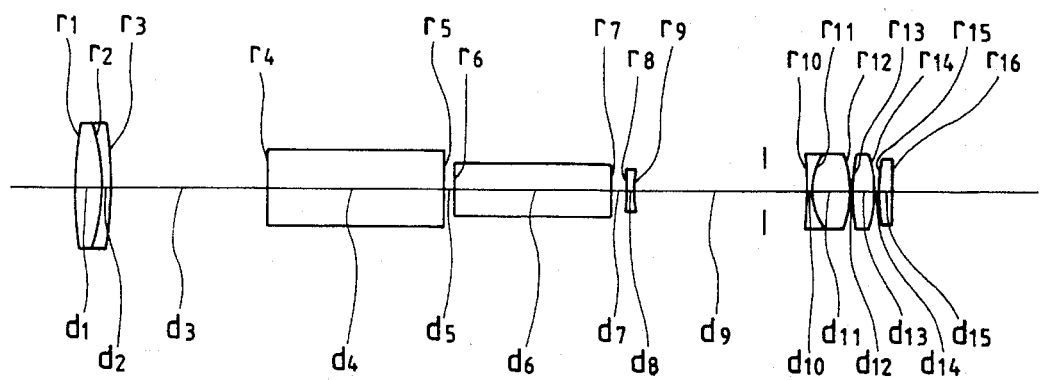

FIGS. 15, 17 and 19 show a third example of the lens composition for the zooming optical system of the present invention at low, moderate and high magnifications, respectively. Specific numerical data for the system are given in Table 9. In Lens Composition 3, two of the five lens elements in the eyepiece optical unit, namely, the first lens positioned closest to the object and the fourth lens, are plastic lenses.

Figure 16:
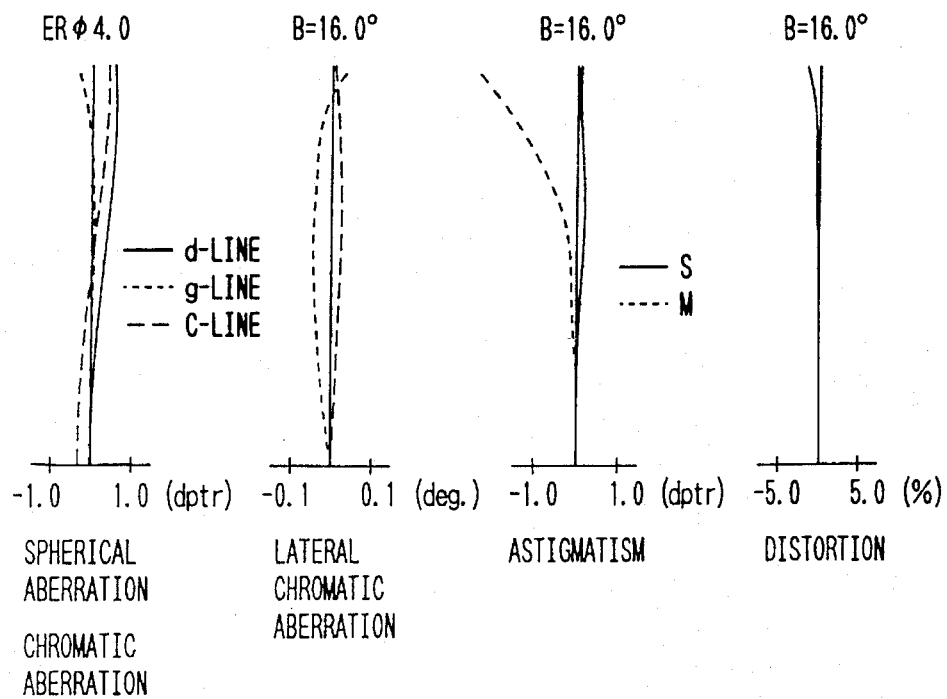
FIGS. 16, 18 and 20 are graphs plotting the aberration curves for the lens systems as illustrated in FIGS. 15, 17 and 19, respectively.
Figure 18:
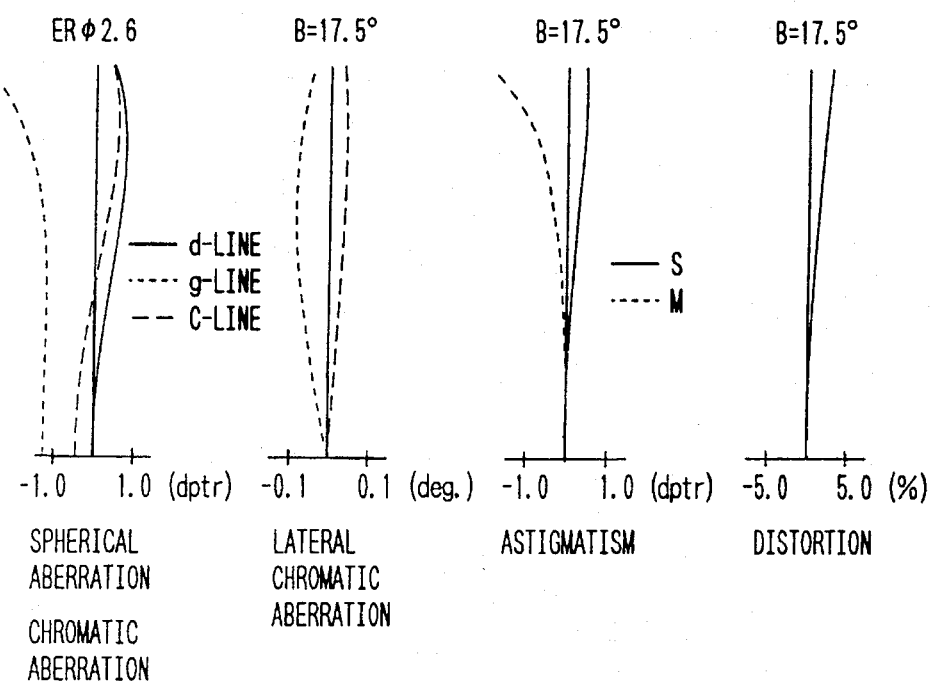
Figure 20:
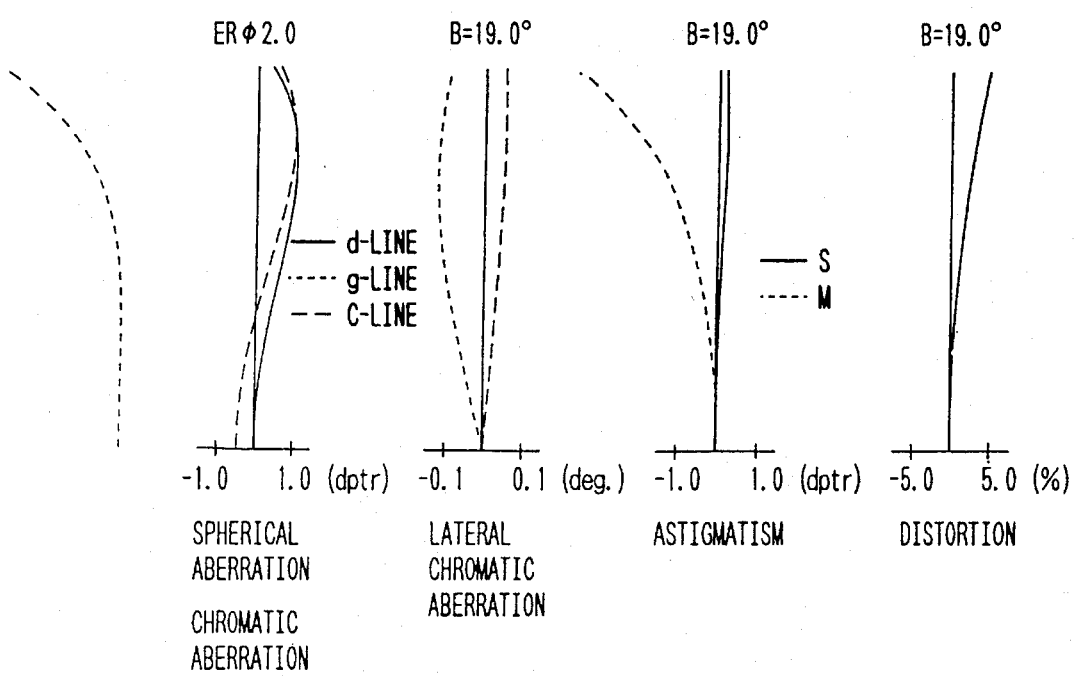

The aberration curves obtained with Lens Composition 3 are plotted in FIGS. 16, 18 and 20 for low magnification, moderate magnification and high magnification, respectively.

TABLE 9

| Surface No. | r | d | n | ν |
|---|---|---|---|---|
| 1 | 64.573 | 5.24 | 1.51633 | 64.1 |
| 2 | −33.786 | 1.52 | 1.62004 | 36.3 |
| 3 | −95.352 | 28.57 | | |
| 4 | ∞ | 32.38 | 1.56883 | 56.3 |
| 5 | ∞ | 1.91 | | |

TABLE 9-continued

| Surface No. | r | d | n | v |
|---|---|---|---|---|
| 6 | ∞ | 28.57 | 1.56883 | 56.3 |
| 7 | ∞ | variable | | |
| 8 | −160.979 | 1.24 | 1.492 | 57.4 |
| 9 | 14.802 | variable | | |
| 10 | −63.592 | 1.24 | 1.80518 | 25.4 |
| 11 | 14.263 | 6.57 | 1.71300 | 53.8 |
| 12 | −17.104 | 0.38 | | |
| 13 | 50.744 | 3.52 | 1.492 | 57.4 |
| 14 | −27.452 | variable | | |
| 15 | 24.422 | 2.67 | 1.51633 | 64.1 |
| 16 | 186.044 | | | |

TABLE 10

| | Low Magnification | Moderate Magnification | High Magnification |
|---|---|---|---|
| f0 | 100.000 | 136.95 | 165.18 |
| fe | 16.66 | 15.28 | 13.96 |
| ω | 2.67° | 1.94° | 1.58° |
| d7 | 12.35 | 5.78 | 2.75 |
| d9 | 9.55 | 21.55 | 30.82 |
| d14 | 12.51 | 7.07 | 0.84. |

When dioptry adjustment is effected by the method shown in FIG. 1, the dioptry present for the low magnification will vary at the moderate and high magnifications as shown in Table 11. Table 12 shows the numerical data obtained in the case where the same optical system is used, but where dioptry adjustment is by the prior art method shown in FIG. 21. In Tables 11 and 12, symbol fx denotes the collective focal length of the dioptry adjusting lens groups.

TABLE 11

| DIOPTRY fx (In Diopters) | | |
|---|---|---|
| Low Magnification | Moderate Magnification | High Magnification |
| −4.0 | −4.6 | −5.3 |
| −2.0 | −2.2 | −2.4 |
| −1.0 | −1.0 | −1.0 |
| 0.0 | +0.2 | +0.4 |
| +2.0 | +2.6 | +3.3 |
| 16.66 | 15.28 | 13.96 |

TABLE 12

| DIOPTRY fx (In Diopters) | | |
|---|---|---|
| Low Magnification | Moderate Magnification | High Magnification |
| −4.0 | −7.7 | −12.8 |
| −2.0 | −3.2 | −4.9 |
| −1.0 | −1.0 | −1.0 |
| 0.0 | +1.2 | +2.9 |
| +2.0 | +5.7 | +10.8 |
| 14.88 | 9.93 | 7.50 |

As described above, the variations in the focal length of the dioptry adjusting lens groups that occur during zooming can be held to small levels in the system of the present invention, which hence is characterized by a very small amount of eyesight mismatch that occurs during zooming.

What is claimed is:

1. An afocal zooming optical system comprising a plurality of lens components, wherein at least a first and a second of said plurality of lens components are movable along an optical axis for changing a magnification of the optical system and said first lens component is moved while said second lens component remains stationary for dioptry adjustment without changing a magnification of the optical system, wherein at least a third of said plurality of lens components is movable for dioptry adjustment and is not movable for changing a magnification of the optical system.

2. An afocal zooming optical system comprising a field ring, an objective optical unit positioned closer to the object than said field ring for defining the field range and an eyepiece optical unit positioned closer to the eye than said field ring, with at least part of the eyepiece optical unit being moved for changing a magnification of the optical system whereas said eyepiece optical unit is moved en masse along the optical axis while all portions of said objective optical unit remain stationary for dioptry adjustment without changing the magnification of the optical system.

3. An afocal zooming optical system comprising a zooming lens component movable along the optical axis for changing a magnification of the optical system and a fixed lens component not movable when a magnification of the optical system is changed, with a positive lens unit in said zooming lens component being moved together with a lens unit in said fixed lens component that is positioned closer to the eye than said positive lens unit for dioptry adjustment without changing a magnification of the optical system.

4. An afocal zooming optical system comprising: in order from the object side, a first lens unit having a positive power and fixed during operation for changing a magnification of the optical system and dioptry adjustment;

a second lens unit having a negative power, said second lens unit being movable in an optical axis direction during operation for changing a magnification of the optical system but fixed during dioptry adjustment;

a third lens unit having a positive power and moveable in the optical axis direction during operation for changing a magnification of the optical system and dioptry adjustment; and a fourth lens unit having a positive power, said fourth lens unit being fixed during operation for changing a magnification of the optical system but moveable in the optical axis direction during dioptry adjustment.

5. The afocal zooming optical system according to claim 4, wherein a field ring is interposed between said second lens unit and said third lens unit.

* * * * *